United States Patent

Haeusler et al.

[11] 3,943,434
[45] Mar. 9, 1976

[54] ARRANGEMENT FOR MEASURING TEMPERATURES

[75] Inventors: Jochen Haeusler, Nurnberg-Laufamholz; Roland Horn; Werner Kirschner, both of Nurnberg, all of Germany

[73] Assignee: Siemens Aktiengesellschaft, Munich, Germany

[22] Filed: Feb. 6, 1974

[21] Appl. No.: 440,049

[30] Foreign Application Priority Data
Feb. 14, 1973 Germany............................ 2307296

[52] U.S. Cl. ............. 323/69; 73/362 AR; 323/75 B; 323/75 N
[51] Int. Cl.² ........................................... G01K 7/24
[58] Field of Search ...... 73/342, 362 AR; 323/75 B, 323/75 H, 75 N, 69

[56] References Cited
UNITED STATES PATENTS

| | | | |
|---|---|---|---|
| 3,278,834 | 10/1966 | Perino........................... | 323/69 |
| 3,316,765 | 5/1967 | Trolander et al. ............. | 73/362 AR |
| 3,541,857 | 11/1970 | Massey........................... | 73/362 AR |
| 3,568,044 | 3/1971 | Elazar............................ | 323/75 N |
| 3,738,174 | 6/1973 | Waldron......................... | 73/362 AR |
| 3,743,926 | 7/1973 | Yerman ......................... | 323/75 N |

OTHER PUBLICATIONS
Oswald; R. K., *Thermistor Temperature to Current Transducer,* in *IBM Technical Disclosure Bulletin,* Vol. 7, No. 12, May, 1965, pp. 1124–1126.

*Primary Examiner*—Richard C. Queisser
*Assistant Examiner*—Frederick Shoon
*Attorney, Agent, or Firm*—Kenyon & Kenyon Reilly Carr & Chapin

[57] ABSTRACT

An improved arrangement for measuring temperatures in which a bridge containing two temperature dependent resistances is used. A first branch of the bridge consists of a parallel connection of two series circuits each consisting of a constant resistance and a temperature-dependent resistance and a second branch of the bridge consists of a series circuit of two constant resistances. Means are provided to impress a constant current on the first bridge branch so that the current divides between the two constant resistances at the input and flows out between the two temperature dependent resistances. At the second bridge branch, a voltage corresponding to the voltage generated in the first bridge branch is impressed. A junction of the second bridge branch is at the same potential as the current sink of the first bridge branch. The output for measuring a temperature proportional voltage is taken across the junction of the two constant resistances in the second bridge branch and the junction between one constant and one temperature dependent resistance in the first bridge branch.

4 Claims, 1 Drawing Figure

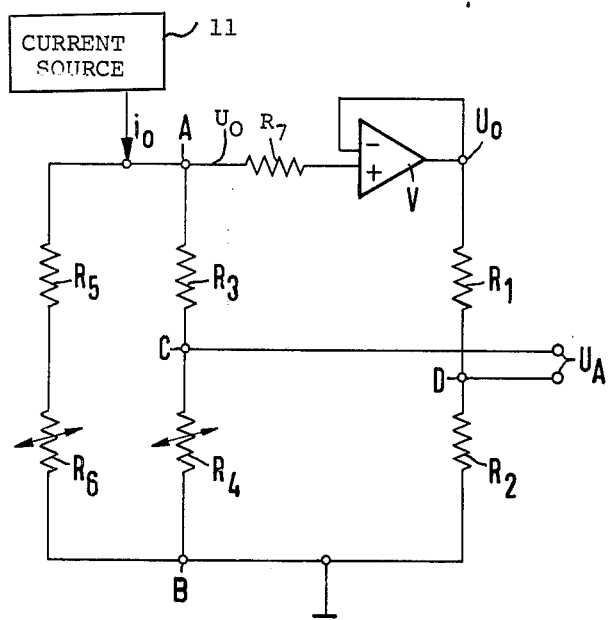

ARRANGEMENT FOR MEASURING TEMPERATURES

BACKGROUND OF THE INVENTION

This invention relates to temperature measurement in general, and more particularly to an improved bridge circuit for providing a temperature proportional output.

With the increasing use of digital voltmeters in measurement and automation, along with the acquisition of measurement data controlled by process computers, transducers whose output voltages are proportional to the measurement quantity converted into an electrical signal are required in order to avoid the burdensome conversions.

For use in temperature measurements, the most popular temperature transducers aside from thermocouples, are resistance thermometers having a characteristic $R(t) = R_0 (1 + \alpha t + \beta t^2 + \gamma t^3)$. These are commonly employed in a bridge circuit. If the bridge operates using a deflection system, the voltage generated in the bridge diagonal is not strictly proportional to the measured temperature. This is a well known phenomenon [See ATM J 910, Oct. 14, 1968, pp. 217 to 220.] However, it can be corrected if indicating meters are used by using a non-linear scale. Since this is not possible when using digital voltmeters, circuit must be provided to linearize the readings. It is well known that the quadratically temperature dependent term in the diagonal bridge can be eliminated by suitable design of the simple Wheatstone bridge, using nickel resistance thermometers. It is also known that this is not a simple possibility if instead the more commonly used platinum resistance thermometers are used. As is well known, these are more important because of their reproducibility and larger permissible temperature range.

Thus, complex circuits are required to linearize the outputs of bridges using platinum resistance thermometers. In the above cited literature reference, such a circuit using two platinum resistance thermometers and multiple bridges is shown but without any design procedures and attainable results given. A multiple bridge system is also known from German Auslegeschrift 1,182,873, which describes the temperature measuring circuit with linear indications. Another circuit arrangement for linearizing the characteristics of thermo resistors by means of active circuit elements with negative feedback elements is shown in German Auslegeschrift 1,138,251. In this arrangement, the non-linearity of the resistance change is reduced in a negative-feedback circuit using transistors.

Another prior art resistance thermometer described in German Offenlegungsschrift 1,573,167 teaches linearizing using suitable interconnection of resistances with opposite sign for the resistance term which is a square-law function of temperature. This method is not suited for a bridge circuit, since even a resistance depending linearly on the temperature leads to a bridge voltage which is not temperature proportional. The combination of different materials required for this proposed linearization narrows the combination to the temperature range permissible with nickel, if standard resistors are to be used. In the absence of further parameters, the combination is further fundamentally limited to the elimination of the terms which depend on the temperature quadratically. Another prior art temperature measuring amplifier which is described in the magazine "Electronic Journal" of June, 1970, No. 6, pp. 48 to 51, is subject to the same limitation. In the arrangement disclosed therein, a voltage proportional to the resistance increase is squared in a multiplier and provided with a suitable scale factor, and then added to the voltage, since the cubic term depending on the temperature can fundamentally not be eliminated in the output voltage if the square term is to vanish.

Thus, it can be seen that there is a need for a temperature measuring arrangement of this nature in which a simply designed bridge can be used for the temperature measurement with the diagonal voltage of the bridge having both square and cubic temperature dependent terms which vanish, without requiring the use of expensive circuit units such as multipliers.

Summary of the Invention

The present invention provides such a circuit in which the first branch of a bridge consists of a parallel connection of two series circuits each consisting of a constant resistance and a temperature dependent resistance, and with the second branch of the bridge consisting of a series circuit of two constant resistances. In addition, a constant current is impressed in the first bridge branch in such a manner that the current is fed in and splits between the two constant resistances and the current sink is connected to the output of the two temperature dependent resistors. At the second bridge branch, a voltage is impressed corresponding to the voltage generated in the first bridge branch, so that a junction point of the second bridge branch is at the same potential as the current sink of the first bridge branch. The output for providing a temperature proportional voltage is connected between a first terminal at the junction between the two constant resistances of the second bridge branch and a second terminal between one constant and one temperature dependent resistance of the first bridge branch.

In the preferred embodiment, the voltage impressed on the second bridge branch is impressed by connecting the two bridge branches through a non-inverting amplifier. In addition, in the preferred embodiment, the two temperature dependent resistances are equal.

BRIEF DESCRIPTION OF THE DRAWINGS

The single FIGURE is a circuit diagram of the bridge circuit of the present invention.

DETAILED DESCRIPTION OF THE PREFERRED EMBODIMENT

The single figure illustrates a preferred embodiment of the invention. As illustrated, a bridge is formed comprising a first branch made up of two series circuits. The series circuit consisting of constant resistor $R_5$ and temperature dependent resistor $R_6$ in series is connected in parallel with a second series combination of constant resistor $R_3$ and temperature dependent resistor $R_4$. The second bridge branch consists of the two fixed resistors $R_1$ and $R_2$. A current $i_0$ is impressed using a conventional current source 11, in the first bridge branch and flows to ground therethrough. The voltage developed across the first bridge branch is impressed on the second bridge branch through a non-inverting amplifier V which is connected to point A through an input resistor $R_7$. Amplifier V is arranged to have unity gain so that the voltage at point A indicated as $U_0$ will appear at its output and be provided across the second bridge branch consisting of resistors $R_1$ and $R_2$. Both bridge branches are referenced to the point B which will preferably be grounded. The voltage drop across the bridge branch between points A and B will be as follows:

$$U_0 = \frac{(R_3 + R_4)(R_5 + R_6)}{R_3 + R_4 + R_5 + R_6}$$

This voltage, as noted above, is impressed across series resistors $R_1$ and $R_2$ by the amplifier V which ensures that no current load will be placed on the first bridge branch. In contrast to the simple Wheatstone bridges and the proposed arrangement shown in ATM J 910 of October 14, 1968, pp. 217 to 220, which shows arranging a second platinum resistor in the bridge diagonal, the diagonal bridge voltage $U_A$ generated between points C and D does not in the present arrangement approach a finite limit with increasing $R_4(t)$ and $R_6(t)$, i.e., with increasing temperature $t$, but only a magnitude proportional to $R_5$. This is primarily due to the decoupling of the bridge branches through the amplifier V. Thereby, the lag of the diagonal bridge voltage behind the temperature, which is quite typical for present bridge circuits, is eliminated on one hand, and on the other hand, there are available through the ratios $R_2/R_1$, $R_3/R_{40}$ and $R_5/R_{60}$ two variables which can be used for eliminating the square and cubic terms in the diagonal of the bridge, which terms depend on temperature. Thus, using two equal platinum resistors $R_4 = R_6 = R_{60}(1+ \alpha\ t+ \beta\ t^2+ \gamma\ t^3)$ and with the standarized coefficients in such resistors of $\alpha = 3.9.10^{-3} / °C$, $\beta = -0.6.10^{-6} /(°C)^2$ and $\gamma = 4.35.10^{-10} / (°C)^3$, the following results can be obtained with the resistances ratios $R_5/R_{60} = 5.82$ and $R_1/R_2 = R_3/R_{40} = 10.863$

| t/°C | −200 | −150 | −100 | −10 | +100 | +200 |
|---|---|---|---|---|---|---|
| $\frac{U_A/i_o}{.t/°C}$ | −1,3035 | −1,3042 | −1,3045 | −1,3046 | −1,3048 | −1,3055 |
| t/°C | +300 | +400 | +500 | +600 | +700 | +800 |
| $\frac{U_A/i_o}{.t/°C}$ | 1,3072 | 1,3110 | 1,3164 | 1,3240 | 1,3341 | 1,3469 |

In an ideal measuring arrangement, the ratio $(U_A/i_o)$/ohm would be constant. As shown by the Table, for temperatures in the range from −200° to +200 °C, a linearity of better than ± 0.1% is obtained with the measurement of the present invention. The linearity between −200° and +500 °C is better than ± 1% and over the entire range standarized for platinum resistors of −200° to +800 °C, a linearity of better than 1.65% is obtained. The two equal temperature dependent resistors preferably will be in a single four lead structural component of a type well known in the art, to ensure that both sense the same temperature.

Thus, an improved bridge circuit for measuring temperature which can be used with devices requiring a linear input, has been shown. Although specific embodiments have been illustrated and described, it will be obvious to those skilled in the art that various modifications may be made without departing from the spirit of the invention which is intended to be limited solely by the appended claims.

What is claimed is:

1. An improved bridge circuit for providing a temperature dependent output comprising:
   a. a first bridge branch made up of the parallel combination of two series circuits, one series circuit including a first constant resistor and a first temperature dependent resistor and the other a second constant resistor and a second temperature dependent resistor with the constant resistors coupled together to form one terminal of the bridge branch and the ends of the two temperature resistances coupled together to form a second terminal of the bridge branch;
   b. a second bridge branch comprising third and fourth constant resistors in series;
   c. means coupled to said first terminal impressing a constant current through said first bridge branch;
   d. a current sink coupled to said second terminal;
   e. means coupling the voltage at said first terminal to one side of said second bridge branch; and
   f. means coupling said current sink to the other side of said second bridge branch, whereby the voltage developed between the junction of said third and fourth resistors in said second branch and the junction between a constant resistor and a temperature dependent resistance in one of said series circuits in said first branch will be a voltage which is temperature dependent.

2. The invention according to claim 1 wherein said means coupling said voltage is a non-inverting amplifier.

3. The invention according to claim 1 wherein said temperature dependent resistances in said first and second series circuits are equal.

4. The invention according to claim 3 wherein said temperature dependent resistances are located in a structural component having four leads.

* * * * *